H. D. JUSTI.
Flexible-Shafting.

No. 216,858. Patented June 24, 1879.

Witnesses:
Donn P. Twitchell
William N. Dodge

Inventor:
H. D. Justi
By Dodge & Son
Attys

UNITED STATES PATENT OFFICE.

HENRY D. JUSTI, OF PHILADELPHIA, PENNSYLVANIA.

IMPROVEMENT IN FLEXIBLE SHAFTING.

Specification forming part of Letters Patent No. 216,858, dated June 24, 1879; application filed May 7, 1879.

*To all whom it may concern:*

Be it known that I, HENRY D. JUSTI, of Philadelphia, in the county of Philadelphia and State of Pennsylvania, have invented certain Improvements in Flexible Shafting, of which the following is a specification.

My invention consists, primarily, in constructing a shaft of a series of small elastic wires or rods arranged parallel, or substantially so, with each other, and connected at their ends in such manner that they may adjust themselves independently of each other; and, secondly, in the peculiar manner of connecting and supporting the wires.

Figure 1:
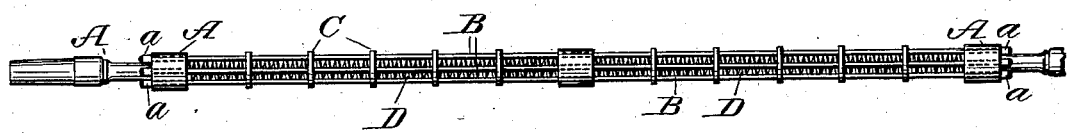
Figure 2:
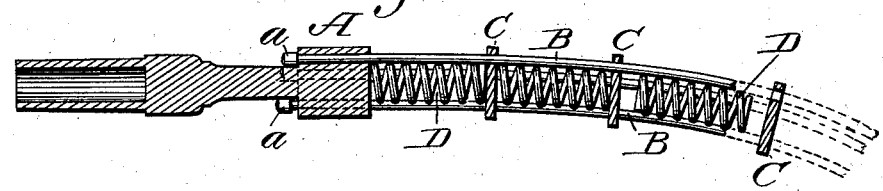
Figure 3:
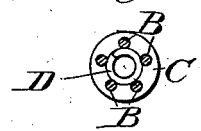

Figure 1 represents a side elevation of my improved shaft; Fig. 2, a longitudinal section of the same; Fig. 3, a cross-section of the same.

A A represent two metallic journals or end pieces, connected by a series of loose elastic rods or wires, B, which are arranged parallel with each other and extended through holes in the end pieces, as shown. The rods fit closely in their holes, but are free to slide endwise therein, and are provided on their ends with heads or enlargements a, to prevent them from escaping. The rods thus arranged serve as a flexible shaft or connection between the end pieces, A, and serve to transmit motion from one to the other; but at the same time, owing to their flexibility and freedom to slide through the end pieces, they permit the latter to be turned and twisted freely in all directions out of line with each other.

In order to sustain the rods and prevent them from wearing against each other, and to keep the end pieces from sliding inward, I mount upon and around the wires at short intervals perforated plates or washers C, and between said washers mount short spiral springs D, which are held in place by the wires or rods, and arranged to press at their ends against the washers, as shown. When the rods or wires are thus sustained they may be bent and twisted freely in all directions without interfering with their proper action.

Instead of the washers and spiral springs, other means may be employed for holding the wires in their proper relative positions. The washers may be secured rigidly to one of the wires and the other wires permitted to slide freely through them, and in this way the necessity of the springs avoided.

In order to prevent the heads or end pieces from sliding together in the event of the springs being omitted, they may be secured rigidly to the ends of one of the wires, provided the remaining wires have the loose sliding connection and are made somewhat longer to admit of their being bent without cramping or binding.

I am aware that rubber blocks have been connected in line by means of a series of rods to form an elastic coupling to receive endwise strains, and also that rigid sections having small interposed elastic washers have been connected by ropes and wires to form masts, axles, and like articles which require to be slightly elastic while possessing great strength and stiffness.

My device is particularly and specially designed to resist torsional strains, and at the same time bend freely in all directions.

Having described my invention, what I claim is—

1. A flexible shaft for transmitting torsional strains, consisting of two heads or couplings, A, and a series of independent elastic wires having sliding connections with the heads, as shown and described, whereby the wires are caused to transmit rotary motion from one head to the other.

2. The combination, in a flexible driving-shaft, of the two heads or couplings A, the series of elastic wires having loose connection therewith, and the series of thin washers C, as shown, whereby the shaft is permitted to bend at every point in its length.

3. The combination of the end pieces, the flexible wires or rods, the loose washers, and the spiral springs, substantially as shown.

HENRY D. JUSTI.

Witnesses:
C. BROSSMANN,
A. A. TOPPIN.